Sept. 4, 1923.
C. FISCHER
MAGNETIC SPEEDOMETER
Filed Dec. 12, 1919
1,467,031
4 Sheets-Sheet 1
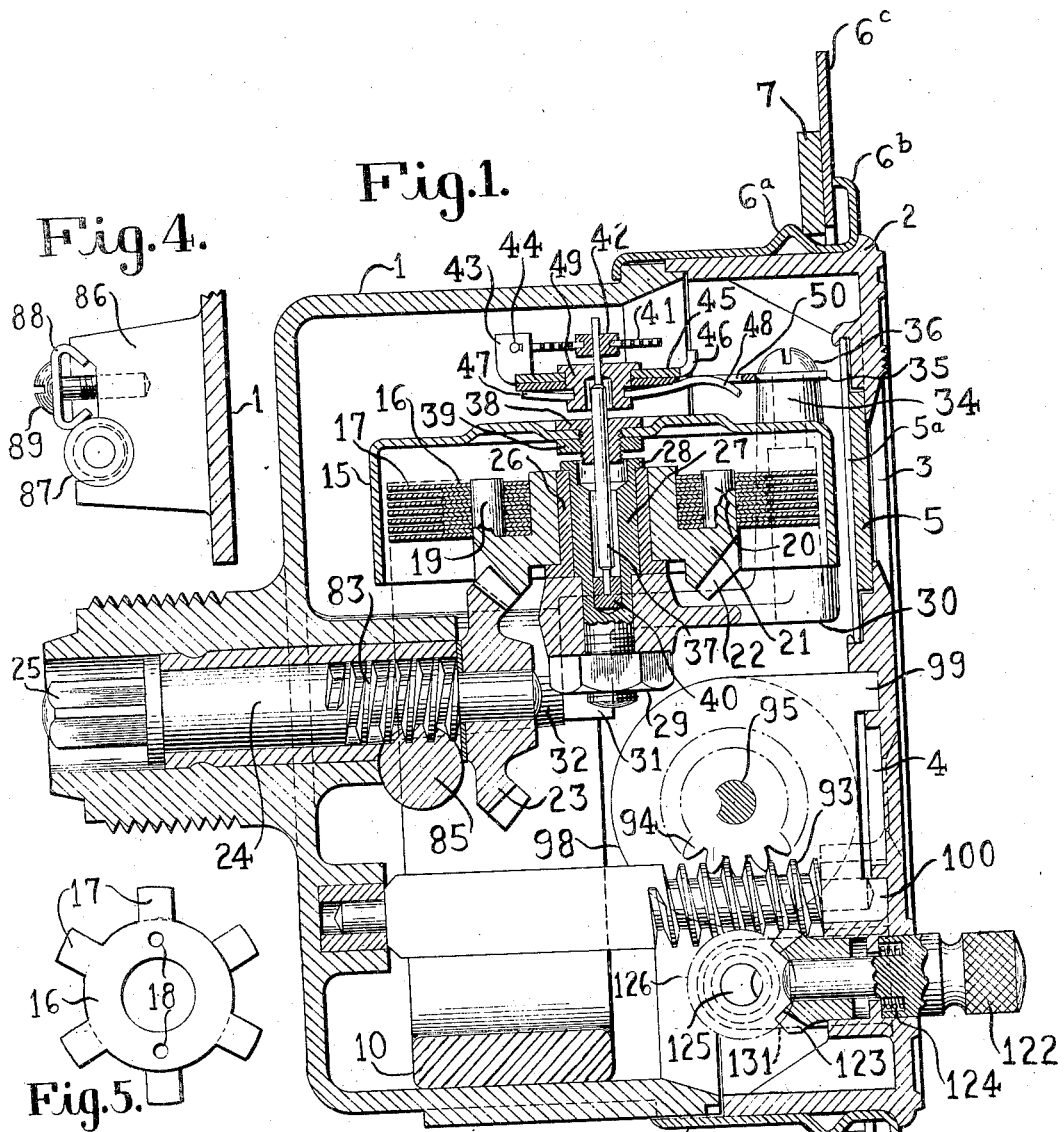
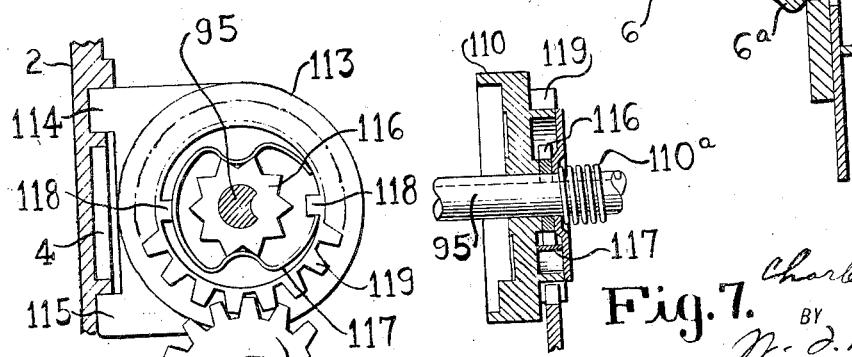
INVENTOR
Charles Fischer
BY
ATTORNEY Sept. 4, 1923.

C. FISCHER

MAGNETIC SPEEDOMETER

Filed Dec. 12, 1919

INVENTOR
Charles Fischer
BY
W. J. Bissing
ATTORNEY

Sept. 4, 1923.
C. FISCHER
1,467,031
MAGNETIC SPEEDOMETER
Filed Dec. 12, 1919. 4 Sheets-Sheet 3
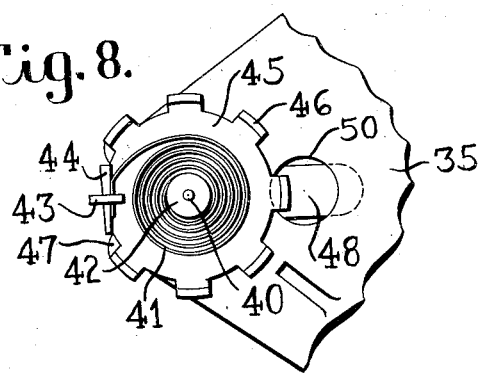
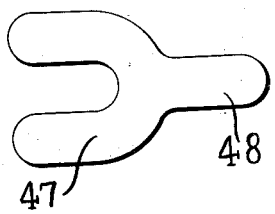
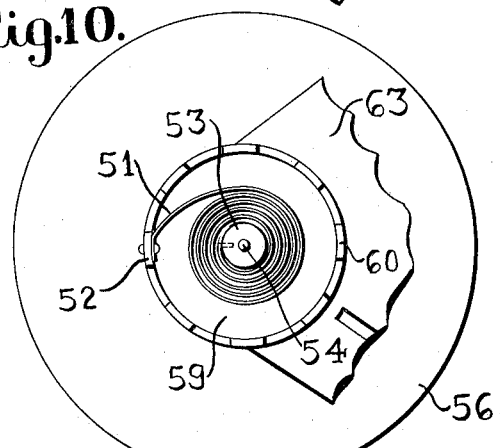
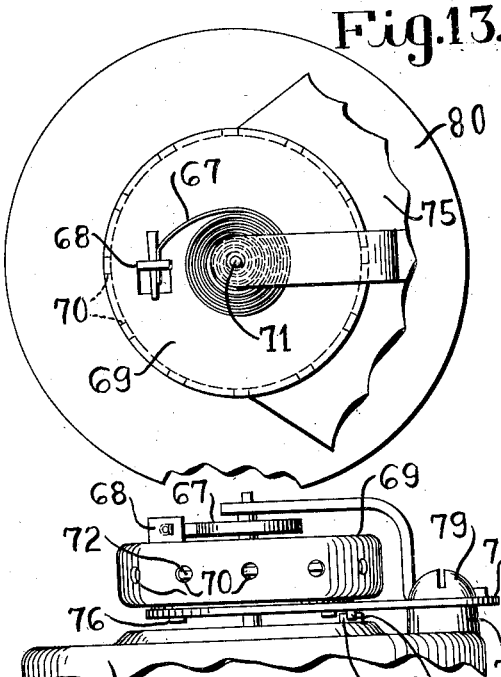
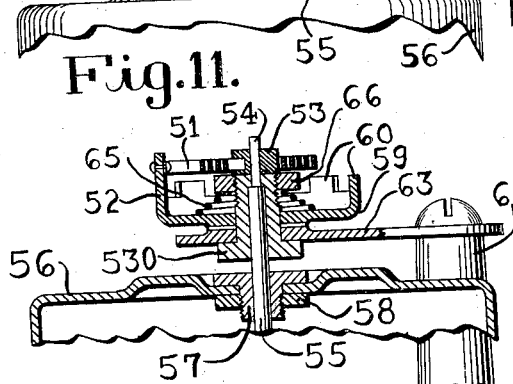
INVENTOR
Charles Fischer
BY
W. J. Bissing
ATTORNEY Sept. 4, 1923.  
C. FISCHER  
MAGNETIC SPEEDOMETER  
Filed Dec. 12, 1919  
1,467,031  
4 Sheets-Sheet 4
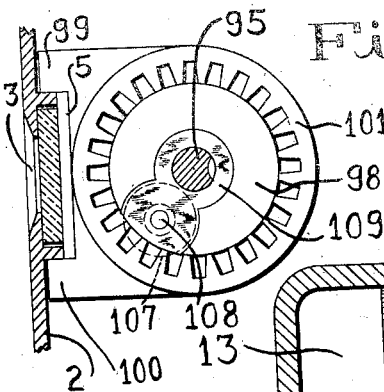
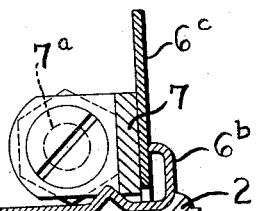
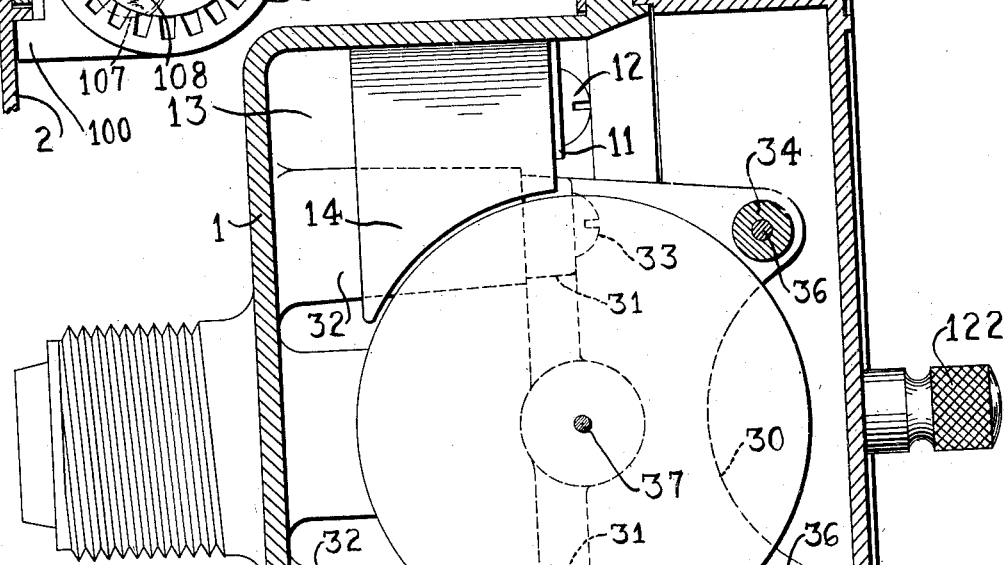
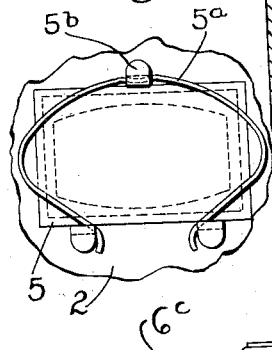
INVENTOR  
Charles Fischer  
BY  
W. J. Bising  
ATTORNEY Patented Sept. 4, 1923.

1,467,031

UNITED STATES PATENT OFFICE.

CHARLES FISCHER, OF NEW YORK, N. Y.

MAGNETIC SPEEDOMETER.

Application filed December 12, 1919. Serial No. 344,450.

*To all whom it may concern:*

Be it known that I, CHARLES FISCHER, a citizen of the United States, residing at 3657 Broadway, city, county, and State of New York, have invented certain new and useful Improvements in Magnetic Speedometers, of which the following is a specification.

My invention relates to speedometers of the magnetic type in which the speed indicating dial is actuated by the magnetic drag produced by the generation of eddy currents in the dial resulting from the relative movement between a magnetic armature and a field magnet which energizes the armature.

The present invention is an improvement on the invention illustrated in Patent Number 1,207,647, dated December 5, 1916, issued to C. G. Smith and assigned to me.

In the present improvement I make use of a stationary circular band magnet and a rotating armature in the magnetic field of which the indicating cup is mounted to move, the circular shape of the magnet permitting the mechanism to be mounted within its confines so as to economize space.

In accordance with the invention disclosed in the said Smith patent, I magnetize the rotating armature by the field magnet at or above saturation and make the rotating armature of a magnetic material having a comparatively low saturation point, magnetizing it at or above its saturation point by the stationary field magnet. In this way the armature composed of magnetic material is magnetized by the field magnet to such a point as to have substantially constant intensity of magnetization for moderate variations in the strength of the field magnet.

By this means the instrument is made independent of temperature changes, ageing, etc. Such temperature changes within the limits that occur in practice have therefore negligible effect on the accuracy of the instrument.

The speed indicating dial may, if desired, be slotted in accordance with Smith Patents 1,312,081; 1,312,082, and 1,312,083, also assigned to me.

One object of my invention is to provide a calibrating device for the speedometer that will permit its calibration and adjustment after the mechanism has been assembled in its case, without again disassembling which would otherwise be necessary.

In accordance with my invention I provide a calibrating spring for the indicating cup with means for adjusting the resistance of the spring, this being set by hand after the mechanism is assembled in place. I do not vary the length of the spring, but provide a simple and efficient means for adjusting and varying the tension.

Another object of my invention is to provide a simple and efficient re-setting means for the trip register forming part of the speedometer.

Another object is to provide improvements in the trip and total registers including a removable mounting therefor and a simple and efficient bracket for holding and locking the pinion shaft on which the carrier pinions of the total register are mounted.

Another object is to provide improvements in retaining the glass in the window.

Certain other features of the invention are more fully pointed out in the claims.

Turning now to the drawings attached to the specification and forming a part thereof, Fig. 1 illustrates a vertical transverse section thru the center of the instrument.

Fig. 4 is a detail view of the means for holding the bearing for one of the register driving shafts.

Fig. 5 is a detail of two of the laminated plates forming the rotating armature.

Fig. 6 is a detail of part of the re-setting mechanism for the trip register.

Fig. 7 is a section of the parts shown in Fig. 6.

Fig. 8 is a detail in plan of the calibrating device for the indicating cup.

Fig. 9 is a detail of the friction brake forming part of the calibrating device.

Fig. 10 is a view of a modified form of a calibrating device.

Figs. 11 and 12 illustrate elevation and sectional views of the construction shown in Fig. 10.

Fig. 13 shows another form of calibrating device.

Figs. 14 and 15 show elevations and sec-

Figure 2:
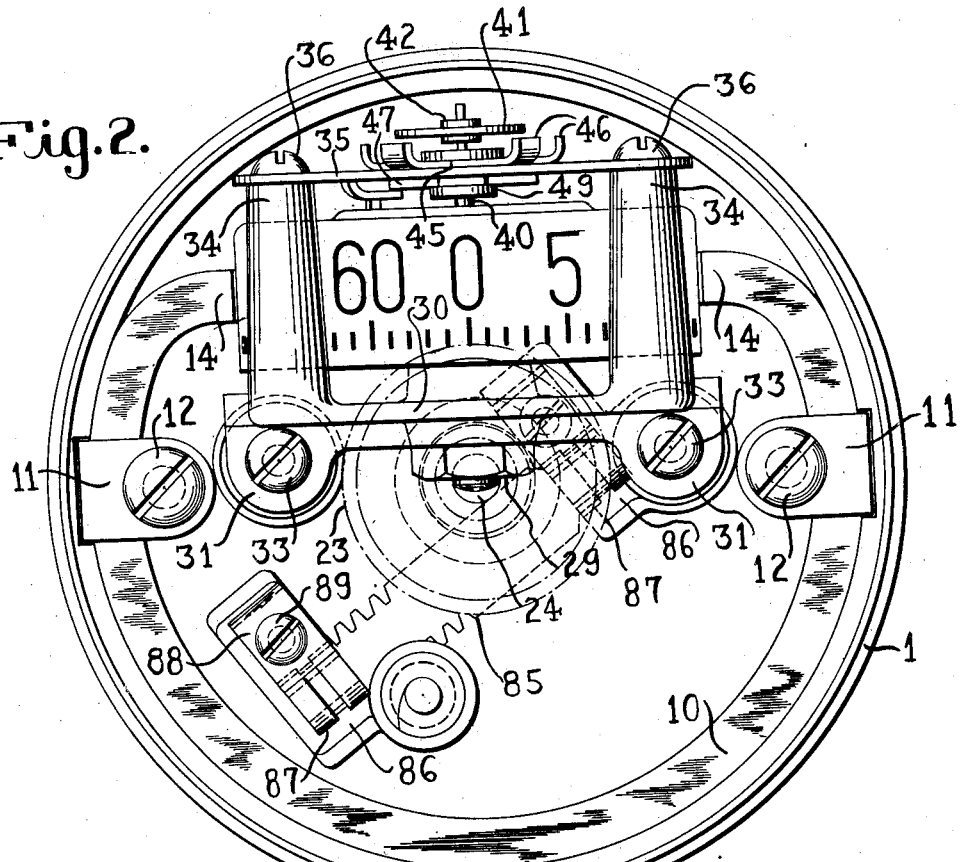
Fig. 2 is a front elevation of the instrument with the case front or cover removed and a bevel gear broken away.
Figure 3:
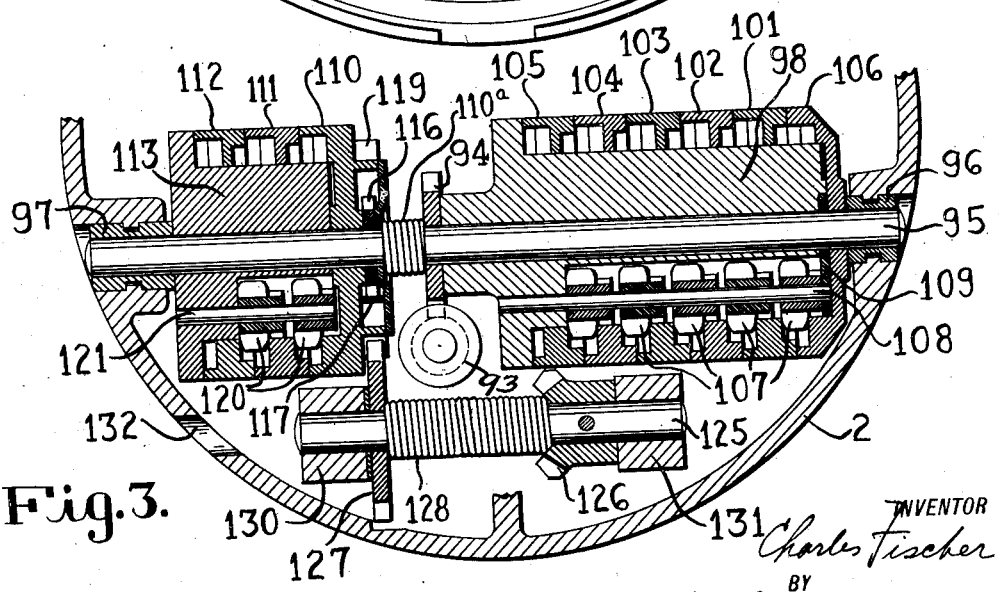
Fig. 3 is a vertical cross section thru the trip and total registers.

therefore provided with two flanges 31 and two posts 32 are cast upon the inside back of the body of the speedometer, thereby enabling the bracket 30 to be secured to the posts by means of the screws 33. The bracket is provided with two upright pillars 34 upon which is mounted a platform 35 secured thereto by screws 36. The platform carries the bearing for one end of the spindle of the indicating cup and the mechanism for calibrating the spring which opposes the motion of the cup.

The indicating cup 15 is provided with a pivot spindle 37 which is attached to the cup by means of a screw bushing 38 secured to the cup by washer 39, the spindle 37 being driven into the bushing.

The spindle 37 is mounted within the hollow bolt 27, its lower end engaging the small stationary step bearing 40 which may be jewelled and is held tightly by the hollow bolt. In this way compactness is secured, space is saved and a pivot bearing is provided for the indicating cup with the two bearing points widely separated, insuring a rigid and strong support for the indicating cup.

In accordance with my invention I provide a calibrating device including a spring that will permit the calibration of the instrument after the mechanism is assembled in the instrument. As illustrated in Fig. 1, I provide a spiral hair spring 41, the inner end of which is secured to a collet 42 which is in turn fastened to the upper part of the dial spindle 37. The outer end of the spring 41 is secured to a movable anchor 43 by means of the pin wedge 44. The anchor 43 is carried by the plate 45, the plate having preferably a plurality of projections 46 which are up-turned and easily reached by a small tool. In this way the anchor 43 may be manually adjusted to different positions by tapping upon the projections 46. The plate 45 is kept in this adjusted position by means of the friction spring 47 with its up-turned tail piece 48. The downward pressure of the friction spring 47 which is forked so as to surround the bushing 49, pulls the bushing against the plate 46, thus pressing the plate against the platform 35. The tail 48 of the friction spring engages an opening 50 in the platform 35 so as to prevent lateral movement of the friction spring. The bushing 49 fits the platform 35 loosely and its upper flange engages the plate 45 so that the plate 45 is pressed into frictional engagement with the platform 35. By the above means the instrument can be readily calibrated and the spring will be securely held in the calibrated position, and having been once calibrated, need not be adjusted for temperature changes. I do away with the old way of calibrating necessitating the removal of the wedge pin and keep cutting from the end of the hair spring until the desired tension is attained for correct calibration.

I have shown two other forms of calibrating devices in Figs. 10 to 12 and 13 to 15. In the embodiments of the invention illustrated in Figs. 10 to 12, one end of the flat spiral spring 51 is secured to a movable anchor 52, the inner end of the spiral spring being attached to a collar 53 which in turn is secured to the end 54 of the pivot pin 55. The pivot pin 55 has secured to it the indicating dial 56 by means of the bushing 57 and nut 58. The anchor 52 is integral with the cup shaped member 59, the latter being provided with a series of lugs 60. The cup 59 is provided with ratchet teeth 61 which engage other ratchet teeth 62, the latter being carried by the platform 63. The platform 63 is in turn carried by the standards 64. A spiral spring 65 presses the two ratchets 61 and 62 together by exerting its pressure against the nut 66 which nut is in turn secured to bearing 530. In shifting the position of the anchor 52 when tightening the flat spiral spring 51, the inner end of the spring is held by the pivot pin 54. The anchor and the plate 59 are secured in their new position by the engagement of the ratchet teeth 61 and 62 under the action of the spiral spring 65.

In the embodiment of the invention illustrated in Figs. 13 and 15 the outer end of the spiral spring 67 is anchored to a lug 68 carried by the casing 69, the casing being provided with a plurality of holes 70 on its side. The inner end of the spring is secured to the end 71 of the pivot pin. A spiral spring 72 is contained within the casing and presses the lower rim of the casing up against the flange 73 forming part of the circumferential collar 74, the collar 74 being secured rigidly to the platform 75 as by means of lugs 76 passing thru holes in the platform. The platform 75 and the upper bearing support 77 secured to the platform, are carried by the posts 78, the platform being secured to the posts by screws 79. The indicating cup 80 is secured to the pivot pin 71 by the bushing 81 and nut 82. A stop 820 on the cup strikes a lug 821 on the platform when the indicating cup is at the zero position.

The total and trip registers are driven from the drive shaft 24 by some suitable reduction gearing, as by means of worm 83 which in turn drives countershaft 85. The countershaft 85 has its two ends mounted upon pedestals 86 which are cast upon the back of the body of the casing of the speedometer. These pedestals carry on their tops grooved bushing 87. The bushing 87 is secured in place against lateral movement by means of wedge-like strap 88 which is secured to the pedestal by screw 89.

What I claim as new and desire to secure by Letters Patent is:

1. In a magnetic speedometer the combination of a curved field magnet, a driven armature member carrying a plurality of rotating disks with concentrating teeth arranged to be rotated in the field of the magnet, an indicating cup mounted to oscillate between the disks and the poles of the magnet, a spindle for the cup passing thru it, a spring restraining sad spindle, an anchor for one end of said spring a plate carrying said anchor, means for adjusting the position of said anchor and a brake for holding said plate in its adjusted position.

2. In a magnetic speedometer the combination of a field magnet, with curved limbs, a driven armature member carrying a plurality of rotating disks with concentrating teeth arranged to be rotated in the field of the magnet, an indicating cup mounted to oscillate between the disks and the poles of the magnet, a spindle for the cup passing thru it, a spring restraining said spindle, an anchor for one end of said spring, means for adjusting the position of said anchor, a bracket for carrying said disks and cups, posts carried by the back of the casing and projecting between the limbs of said magnet, means for removably securing said bracket to said posts, one or more pillars mounted on said bracket, a platform removably secured to said pillar, and a bearing for the spindle of the indicating cup carried by said removable platform.

3. In a magnetic speedometer the combination of a field magnet, a drive shaft and a removable and replaceable bracket carrying the driven member, posts to which said bracket is secured, one or more pillars carried by said bracket, a removable hollow bolt extending through said bracket, a plate secured to said pillars, an indicating cup having a portion located between the disks and the poles of the field magnet, a long spindle passing through and carrying said cup, a platform, a bearing for said spindle carried by the platform, a step bearing for the other end of said spindle carried within the hollow bolt, a resistance spring attached to said spindle, an anchor to which one end of said spring is secured and means permitting the manual adjustment of the position of said anchor, thus varying the tension of the spring.

4. In a magnetic speedometer the combination of a field magnet, a drive shaft and a removable and replaceable bracket carrying the driven member, posts to which said bracket is secured, one or more pillars carried by said bracket, a removable hollow bolt extending through said bracket, a plate secured to said pillars, an indicating cup having a portion located between the disks and the poles of the field magnet, a long spindle passing through and carrying said cup, a platform, a bearing for said spindle carried by the platform, a step bearing for the other end of said spindle carried within the hollow bolt, a resistance spring attached to said spindle, an anchor to which one end of said spring is secured and means permitting the manual adjustment of the position of said anchor, thus varying the tension of the spring, said anchor and adjusting means being carried by said platform.

5. In a magnetic speedometer the combination of a field magnet, a drive shaft, an armature driven thereby, and a removable and replaceable bracket carrying the driven member, posts to which said bracket is secured, one or more pillars carried by said bracket, a removable hollow bolt extending through said bracket, a plate secured to said pillar, an indicating cup having a portion located between the disks and the poles of the field magnet, a spindle passing through and carrying said cup, a platform, a bearing for said spindle carried by the platform, a step bearing for the other end of said spindle carried within the hollow bolt, a resistance spring attached to said spindle, an anchor to which one end of said spring is secured and means for adjusting the position of the anchor, thus varying the tension of the spring, and a friction spring for maintaining the anchor in its adjusted position.

6. In a magnetic speedometer the combination of a field magnet, a driven armature carrying a plurality of rotating disks with concentrating teeth, magnetized at or above saturation, arranged to be rotated in the field of said magnet, an indicating cup mounted to oscillate between the disks and the poles of the magnet, a spindle for the cup, a spring attached at one end to said spindle, an anchor connected to the other end of said spring, means for manually adjusting the position of said anchor, thus varying the tension of the spring, when calibrating the instrument and a brake for holding the anchor in its adjusted position.

7. In a magnetic speedometer, the combination of a field magnet, a driven armature carrying a plurality of rotating disks with concentrating teeth, magnetized at or above saturation, arranged to be rotated in the field of said magnet, an indicating cup mounted to oscillate between the disks and the poles of the magnet, a spindle for the cup, a spring attached at one end to said spindle, an anchor connected to the other end of said spring, a plate carrying said anchor and provided with a plurality of lugs, for varying the tension of the spring, when calibrating the instrument and a brake for holding the anchor in its adjusted position.

8. In a magnetic speedometer, the combination of a field magnet, a driven armature carrying a plurality of rotating disks with concentrating teeth, magnetized at or above saturation, arranged to be rotated in the field of said magnet, an indicating cup mounted to oscillate between the disks and the poles of the magnet, a spindle for the cup, a platform, posts carrying said platform, a bushing passing thru said platform, forming a bearing for one end of said spindle, a spring attached at one end to said spindle, an anchor connected to the other end of said spring, an adjustable plate to which said anchor is connected, a friction spring beneath said platform and connected to said bushing, said spring pressing the plate against the platform.

9. In a magnetic speedometer, the combination of a field magnet, a driven armature carrying a plurality of rotating disks with concentrating teeth, magnetized at or above saturation, arranged to be rotated in the field of said magnet, an indicating cup mounted to oscillate between the disks and the poles of the magnet, a spindle for the cup, a platform, posts carrying said platform, a bushing passing thru said platform, forming a bearing for one end of said spindle, a spring attached at one end to said spindle, an anchor connected to the other end of said spring, an adjustable plate to which said anchor is connected, a forked spring beneath said platform, said forked spring surrounding said bushing, said spring pressing the plate against the platform.

10. In a magnetic speedometer, the combination of a casing, a magnet in said casing, a removable bracket, a hollow bolt passing thru said bracket and removably secured thereto, one or more pillars carried by said bracket, a platform removably secured to said pillars, a driven member provided with a hub, a plurality of magnetizable disks carried by said hub, pins for securing said disks to said hub, a bushing surrounding and engaging said bolt and attached to said hub, said bolt being provided with a flange for retaining said bushing, an indicating cup surrounding said magnetic disks, a spindle carrying said cup, a step bearing located within the hollow bolt for one end of said spindle, a bushing bearing for the other end of said spindle carried by said platform, said bushing being loosely mounted in said platform, a spiral spring attached to the platform end of said spindle, an anchor for one end of said spring, a plate carrying said anchor and mounted between the bushing and the platform, and a friction spring carried by the platform and pressing against said bushing so as to retain said plate in its adjusted position.

11. In a speedometer of the class described, a cylindrical casing having an end wall, two pedestals carried by and extending from said end wall, a magnet secured in place within said casing, a bracket separate from said casing and secured to the free ends of said pedestals, a rotatable speed cup supported by said bracket and having a peripherally extending annular wall which moves adjacent the poles of said magnet, an armature located within said speed cup and rotatable about an axis which coincides with the axis of rotation of said speed cup, a main driving shaft rotatable in a bearing carried by the end wall of said casing and the axis of which is at right angles to the axis about which said armature and speed cup rotate, and means whereby said armature is driven from said driving shaft.

12. In a speedometer of the class described, a bracket, a stationary bearing carried by said bracket and projecting therefrom, an armature rotatable about said bearing, a rotatable speed cup having an annular peripherally extending wall disposed adjacent the periphery of said armature, a stationary magnet the poles of which are disposed adjacent said peripherally extending wall, and which speed cup is rotatable about an axis which coincides with the axis of rotation of said armature, a shaft whereby said speed cup is supported, and bearings supported by said bracket for supporting said shaft.

13. In a speedometer of the class described, a bracket, a fixed bearing carried by and projecting at right angles to said bracket, an armature supported by and rotatable about said bearing, a yoke supported by said bracket and a portion of which extends into a position beyond and in line with said bearing, a shaft the ends of which are supported in bearings, one carried by said yoke and the other by said bearing, and a rotatable speed cup supported by said shaft and having an annular peripherally extending wall disposed adjacent the periphery of said armature.

14. In a speedometer of the class described, a bracket having two horizontally arranged arms, a fixed vertically extending tubular bearing carried by said bracket, an armature supported by and rotatable about said bearing, a yoke supported by said arms and a portion of which extends into a position above said tubular bearing, a shaft the ends of which are supported in bearings one carried by said yoke and the other of which is located within said tubular bearing, and a rotatable speed cup supported by said shaft and having an annular wall disposed adjacent the periphery of said armature.

15. In a speedometer of the class described, a bracket, a stationary bearing carried by and projecting at right angles to said bracket, a hub supported by and rotatable about said bearing, a plurality of discs carried by said hub, and a speed cup supported from said bracket and rotatable about an axis coinciding with the axis of said bearing, and having an annular wall disposed adjacent the periphery of said discs.

16. In a speedometer of the class described, a cylindrical casing having an end wall, two pedestals carried by and extending from said end wall, a main driving shaft rotatable in a bearing carried by the end wall of said casing and located between said pedestals, a bracket separate from said casing and secured to the free ends of said pedestals, and having two arms extending therefrom, a bearing carried by said bracket and extending at right angles to said main driving shaft, a yoke supported by said arms and a portion of which extends into a position beyond and in line with the axis of the bearing carried by said bracket, a shaft the ends of which are supported one by said yoke and the other by said last mentioned bearing, a speed cup supported by said last mentioned shaft and having a peripherally extending annular flange, an armature rotatable about the bearing aforesaid carried by said bracket, and which armature is located within said speed cup, and gearing whereby said armature is driven by said main driving shaft.

17. In a speedometer of the class described, a cylindrical casing having an end wall, two pedestals carried by and extending from said end wall, a magnet secured in place within said casing, a bracket separate from said casing and secured to the free ends of said pedestals, a rotatable speed cup supported by said bracket and having a peripherally extending annular wall which moves adjacent the poles of said magnet, an armature located within said speed cup and rotatable about an axis which co-incides with the axis of rotation of said speed cup, a main driving shaft rotatable in a bearing carried by the end wall of said casing and the axis of which is at an angle to the axis about which said armature and speed cup rotate, and means whereby said armature is driven from said driving shaft.

18. In a speedometer of the class described, a bracket, a stationary bearing carried by said bracket and projecting therefrom, an armature rotatable about said bearing, a rotatable speed cup having an annular peripherally extending wall disposed adjacent the periphery of said armature, a stationary magnet the poles of which are disposed adjacent said peripherally extending wall, and which speed cup is rotatable about an axis which coincides with the axis of rotation of said armature, a shaft whereby said speed cup is supported, and a bearing supported by said bracket for supporting said shaft.

19. In a speedometer of the class described, a bracket, a fixed bearing carried by and projecting at right angles to said bracket, an armature supported by and rotatable about said bearing, a platform having a portion which extends into a position beyond and in line with said bearing, a shaft the ends of which are supported in bearings one carried by said platform and the other by said bearing, and a rotatable speed cup supported by said shaft and having an annular peripherally extending wall disposed adjacent the periphery of said armature.

20. In a speedometer of the class described, a bracket, a fixed vertically extending tubular bearing carried by said bracket, an armature supported by and rotatable about said bearing, a platform having a portion which extends into a position above said tubular bearing, a shaft the ends of which are supported in bearings one carried by said platform and the other of which is located within said tubular bearing, and a rotatable speed cup supported by said shaft and having an annular wall disposed adjacent the periphery of said armature.

21. In a speedometer of the class described, a cylindrical casing having an end wall, two pedestals carried by and extending from said end wall, a main driving shaft rotatable in a bearing carried by the end wall of said casing and located between said pedestals, a bracket separate from said casing and secured to the free ends of said pedestals, a bearing carried by said bracket and extending at an angle to said main driving shaft, a detachable platform having a portion which extends into a position beyond and in line with the axis of the bearing carried by said bracket, a shaft the ends of which are supported one by said platform and the other by said last mentioned bearing, a speed cup supported by said last mentioned shaft and having a peripherally extending annular flange, an armature rotatable about the bearing aforesaid carried by said bracket, and which armature is located within said speed cup, and gearing whereby said armature is driven by said main driving shaft.

22. In a speedometer of the class described, a rotating armature having a plurality of armature teeth disposed about its periphery, and each of which teeth is provided with a plurality of air passages extending parallel with the plane of rotation of said armature; and a stationary magnet the poles of which are located adjacent the periphery of said armature.

23. In a speedometer of the class described, a rotating armature having a plurality of superposed discs circular in form and having each a plurality of teeth so arranged that their teeth lie one over another, and a plurality of spacing rings arranged in alternation with said discs and the peripheries of which are adjacent the bases of said teeth, whereby the teeth are spaced apart from one another; and a stationary magnet the poles of which are located adjacent the periphery of said armature.

24. In a speedometer of the class described, a rotating armature comprising a hub provided with a flange, a plurality of discs, circular in form, and having each a plurality of teeth carried by said hub and supported by said flange, and which discs are arranged one above another with their teeth in alignment, a plurality of spacing rings arranged one between each two successive toothed discs, and means for securing said discs and rings in place upon said hub; and a stationary magnet the poles of which are located adjacent the periphery of said armature.

25. In a magnetic speedometer a rotating armature having a plurality of disks, each disk having a plurality of teeth, said disks being separated so as to provide air passages between the teeth of the armature, in combination with a stationary magnet and a speed indicating cup arranged between the magnet and the armature.

26. In a speedometer of the class described a cup-shaped casing section, a bearing carried by the end wall of said section, a main driving shaft rotatable in said bearing, a bracket located within said section and supported by pedestals extending from the end wall thereof, a hollow stationary shaft or bearing carried by said bracket and arranged at right angles to the said driving shaft, an armature rotatable about said hollow shaft, gearing whereby said armature is driven by said driving shaft, arms extending from said bracket, a yoke carried by said arms and extending into a position above and in line with said hollow shaft, a shaft the axis of which coincides with the axis of said hollow shaft and the upper end of which is supported in a bearing carried by said yoke and the lower end of which extends into said hollow shaft and is supported by a bearing therein, and a speed cup carried by said last mentioned shaft and within which said armature rotates.

27. In a speedometer of the class described, a cylindrical casing having an end wall, two pedestals carried by and extending from said end wall, a bearing carried by said end wall and located between said pedestals, a bracket separate from said casing and supported from the free ends of said pedestals, a rotatable speed indicating member supported by said bracket, an armature located adjacent said speed indicating member and rotatable about an axis which coincides with the axis of rotation of said speed indicating member, a main driving shaft rotatable in the bearing aforesaid and the end of which shaft is supported in a bearing carried by said bracket, and the axis of which shaft is at right angles to the axis about which said armature and speed indicating member rotate, and means whereby said armature is driven from said driving shaft.

In testimony whereof, I have signed my name to this specification, in the presence of a subscribing witness.

CHARLES FISCHER.

Witness:
W. F. BISSING.